US006665804B1

United States Patent
Minowa

(10) Patent No.: US 6,665,804 B1
(45) Date of Patent: Dec. 16, 2003

(54) NON-CONTACT TYPE TRANSMISSION SYSTEM FOR TRANSFERRING DATA ELECTROMAGNETICALLY

(75) Inventor: Manabu Minowa, Hachioji (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/404,815

(22) Filed: Sep. 24, 1999

(30) Foreign Application Priority Data

Jun. 24, 1999 (JP) ......................................... H11-178493

(51) Int. Cl.[7] ................................................ G06F 1/00
(52) U.S. Cl. ....................... 713/322; 713/330; 713/340; 710/106; 710/305
(58) Field of Search ................................ 713/300–310, 713/320, 322, 324, 340; 710/305–306, 311, 315, 38, 31

(56) References Cited

U.S. PATENT DOCUMENTS

| 4,803,350 A | * | 2/1989 | Izawa et al. ................. 235/492 |
| 4,839,854 A | * | 6/1989 | Sakami et al. ............... 710/306 |
| 4,922,283 A | * | 5/1990 | Fukui .......................... 354/484 |
| 5,353,434 A | * | 10/1994 | Katayama ..................... 395/500 |
| 5,384,808 A | * | 1/1995 | Van Brunt et al. ............ 375/36 |
| 5,394,105 A | * | 2/1995 | Axer ............................ 327/531 |
| 5,432,328 A | * | 7/1995 | Yamaguchi ................... 235/449 |
| 5,444,222 A | * | 8/1995 | Inoue ........................... 235/380 |
| 5,610,384 A | * | 3/1997 | Goto ............................ 235/435 |
| 5,875,450 A | * | 2/1999 | Riener et al. ................. 711/104 |
| 6,088,243 A | * | 7/2000 | Shin ............................. 363/21 |
| 6,088,741 A | * | 7/2000 | Murata ......................... 710/20 |
| 6,151,648 A | * | 11/2000 | Haq ............................. 710/107 |
| 6,202,121 B1 | * | 3/2001 | Walsh et al. ................. 711/100 |

FOREIGN PATENT DOCUMENTS

JP          407212988 A    *    8/1995    ............. H02J/9/00

* cited by examiner

Primary Examiner—Paul R. Myers
Assistant Examiner—Raymond N Phan
(74) Attorney, Agent, or Firm—Rabin & Berdo, P.C.

(57) ABSTRACT

A data transmission system includes a first device and a second device communicating with each other by electromagnetic induction. The first device includes a preparing circuit that prepares data having a voltage defined related to a first threshold, and a transmitting circuit that transmits the data. The second device includes a receiving circuit that receives the data from the transmitting circuit, a bias circuit that raises the voltage of the received data by a predetermined voltage to produce a sum voltage, and a judging circuit that judges whether the voltage of the data indicates high or low by comparing the sum voltage with a second threshold that is equal to or larger than the first threshold. The second device may also include a power supply that provides electric power for the first device using a magnetic field.

15 Claims, 3 Drawing Sheets

NON-CONTACT TYPE TRANSMISSION SYSTEM FOR TRANSFERRING DATA ELECTROMAGNETICALLY

This patent application claims priority based on a Japanese patent application, H11-178493 filed on Jun. 24, 1999, the contents of which are incorporated herein by reference.

BACKGROUND OF THE INVENTION

1. Field of the Invention

The present invention relates to a non-contact type data transmission system that electromagnetically transmits and receives data using a coil or the like but using neither a contact-type connector nor a cable.

2. Description of the Related Art

A typical non-contact type data transmission system comprises a data processing device and a data measuring device. The data measuring device may include an IC card and can be easily moved. Due to the high mobility of the data measuring device, it may be used, for example, to measure the temperature in a room that stores various foods such as vegetables, meat and fish during transport via a transport system. In contrast, the data processing device is relatively large and is usually permanently positioned in an office or a factory where it is used to process the data collected by the data measuring device.

During food transportation by truck, train or plane, for example, the data measuring device is able to operate independently and can measure the temperature. At the completion of transportation, the data measuring device is returned to the office or factory and is inserted into the data processing device. The temperature data collected by the data measuring device is transmitted electromagnetically to the data processing device. The data processing device then processes the received data according to the instructions of the operator of the data transmission system.

In order to electromagnetically transmit and receive the data, the data processing device and the data measuring device each have a coil. The data measuring device is designed to be very small and there is no space for a internal power supply, therefore, its electrical power is supplied by an alternating power supply located in the data processing device. The power supply includes a current supply circuit with numerous transistors, an oscillator that switches the current supply circuit, and a coil used for transferal of the electric power to the data measuring device.

Since the coil in the data measuring device is small, the amount of electromagnetic power generated by the coil is also small. Therefore, it is necessary to ensure that the distance between the coils of the data processing device and the inserted data measuring device is kept as short as possible.

Another potential problem involves a failure of the oscillator within the data processing device which may cause the current supply circuit to continuously apply a direct current to the coil, leading to transistor breakage.

SUMMARY OF THE INVENTION

The objective of the present invention is to provide a non-contact type data transmission system that overcomes the issues in the related art as described previously. This objective is achieved by combinations described in the independent claims. The dependent claims define further advantageous and exemplary combinations of the present invention.

According to an aspect of the present invention, there is provided a data transmission system including a first device and a second device communicating with each other by electromagnetic induction, wherein the first device comprises a preparing circuit that prepares a data having a voltage defined related to a first threshold; and a transmitting circuit that transmits the data prepared by the preparing circuit, and the second device comprises a receiving circuit that receives the data from the transmitting circuit; a bias circuit that raises the voltage of the received data by a predetermined voltage to produce a sum voltage; and a judging circuit that judges whether the voltage of the data indicates high or low by comparing the sum voltage with a second threshold that is equal to or larger than the first threshold. It is preferable that the receiving circuit includes a coil that produces an electromotive force upon receiving the data from the transmitting circuit, and the bias circuit includes a diode that is connected to the coil in series to increase the electromotive force by a forward voltage of the diode. It is also preferable that the bias circuit further includes a capacitor that stabilizes the given voltage.

According to another aspect of the present invention, there is provided a data receipt device that receives data by electromagnetic induction comprising: a receiving circuit that receives data having a voltage defined related to a first threshold; a bias circuit raises the voltage of the received data by a predetermined voltage to produce a sum voltage; and a judging circuit that judges whether the voltage of the data indicates high or low by comparing the sum voltage with a second threshold that is equal to or larger than the first threshold. It is preferable that the receiving circuit includes a coil that produces an electromotive force upon receiving the data from the transmitting circuit, and the bias circuit includes a diode that is connected to the coil in series to increase the electromotive force by a forward voltage of the diode. It is also preferable that the bias circuit further includes a capacitor that stabilizes the given voltage.

According to still another aspect of the present invention, there is provided a data transmission system including a first device and second device communicating with each other, the first device having a power supply that provides an electric power for the second device using a magnetic field, wherein the power supply comprises an oscillator that generates an oscillation signal; a magnetic field preparing circuit that prepares the magnetic field; a current supplying circuit that supplies a current to the magnetic field preparing circuit according to the oscillation signal; a detecting circuit that detects a halt of generating the oscillation signal by the oscillator; and a switching circuit that turns off the current supplying circuit upon detecting the halt. It is preferable that the oscillation signal includes a plurality of first pulses, the detecting circuit includes a generating circuit that generates a second pulse that permits the switching circuit to keep the current supplying circuit turned on, in response to each first pulse; and a smoothing circuit that smoothes the second pulses; wherein the switching circuit turns off the current supplying circuit in an absence of the smoothed second pulses. It is further preferable that the generating circuit includes a first resistor and a first capacitor that defines a first time constant of the second pulse, and a flip-flop circuit that detects each first pulse to generate the second pulse defined by the first time constant. Similarly, it is further preferable that the smoothing circuit includes a second resistor and a second capacitor that defines a second time constant used for smoothing the second pulses. It is also preferable that the detecting circuit further includes a Schmidt trigger circuit that forbids the smoothed second pulses to force the turning off of the current supplying circuit due to chatter.

According to still another aspect of the present invention, there is provided a device that communicates by electromagnetic induction, comprising a power supply, wherein the power supply includes an oscillator that generates an oscillation signal; a magnetic field preparing circuit that prepares the magnetic field; a current supplying circuit that supplies a current to the magnetic field preparing circuit according to the oscillation signal; a detecting circuit that detects a halt of generating the oscillation signal by the oscillator; and a switching circuit that turns off the current supplying circuit upon detecting the halt. It is preferable that the oscillation signal includes a plurality of first pulses, the detecting circuit includes a generating circuit that generates a second pulse that permits the switching circuit to keep the current supplying circuit turned on, in response to each first pulse; and a smoothing circuit that smoothes the second pulses; wherein the switching circuit turns off the current supplying circuit in an absence of the smoothed second pulses. It is more preferable that the generating circuit includes a first resistor and a first capacitor that defines a first time constant of the second pulse, and a flip-flop circuit that detects each first pulse to generate the second pulse defined by the first time constant. It is preferable that the smoothing circuit includes a second resistor and a second capacitor that defines a second time constant used for smoothing the second pulses. It is also preferable that the detecting circuit further includes a Schmidt trigger circuit that forbids the smoothed second pulses to force the turning off of the current supplying circuit due to chatter.

According to still another aspect of the present invention, there is provided a data receipt method used for a data receipt device receiving data by electromagnetic induction comprising: receiving a data having a voltage defined related to a first threshold; increasing the voltage of the received data by a predetermined voltage to produce a sum voltage; and judging whether the voltage of the data indicates high or low by comparing the sum voltage with a second threshold that is equal to or larger than the first threshold. It is preferable that the increasing includes raising the voltage of the received data by the predetermined voltage defined by the firth threshold and the second threshold.

According to still anther aspect of the present invention, there is provided a power supplying method used for a device that communicates by electromagnetic induction comprising: generating an oscillation signal; supplying a current according to the oscillation signal; preparing a magnetic field using the current; first detecting a halt of the generating of the oscillation signal; and turning off the supplying the current upon detection of the halt. It is preferable the power supplying method further comprises second detecting the generating of the oscillation signal; and allowing the supplying of the current during detection of the oscillation signal.

This summary of the invention does not necessarily describe all necessary features, thus, the invention may also be a sub-combination of these described features.

DETAILED DESCRIPTION OF THE INVENTION

The invention will now be described based on the preferred embodiments, which are not intended to limit the scope of the present invention, but are used to exemplify the invention. All of the features and the combinations described hereafter in the embodiment are not necessarily essential to the invention.

A non-contact type data transmission system of a preferred embodiment according to the present invention will now be described in detail referring to the accompanying drawings. When describing elements shown in FIGS. 1, 2 and 3, numbers and/or letters following each component facilitate easy identification.

Figure 1:
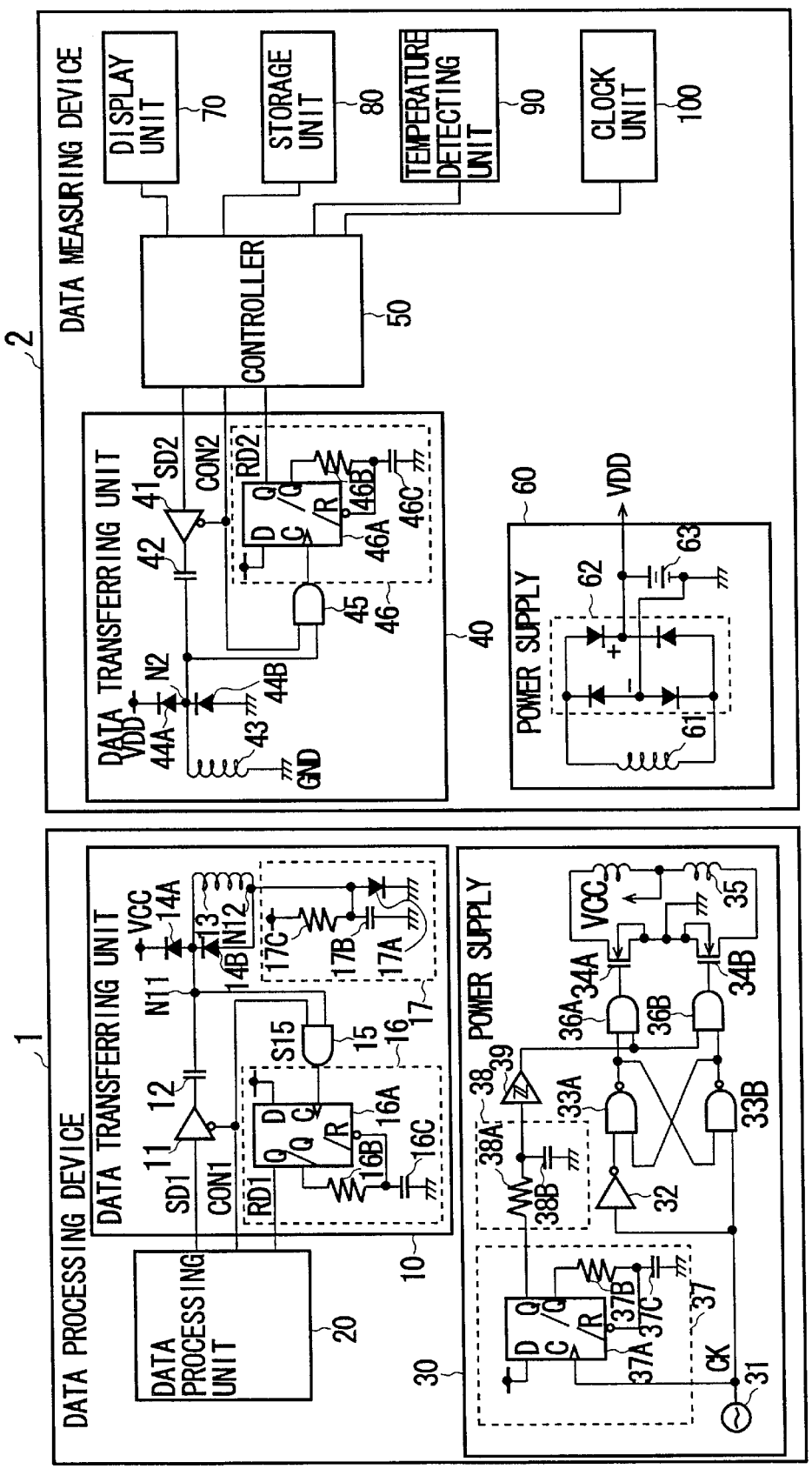
FIG. 1 shows a configuration of the non-contact type data transmission system of the preferred embodiment according to the present invention.

The non-contact type data transmission system of the embodiment shown in FIG. 1, is designed to measure temperature in a transportation system such as a truck, train, ship or plane, in order to analyze the transportation conditions. To achieve this task, the data transmission system comprises a data processing device 1 and a data measuring device 2. A typical data measuring device 2 includes an IC card and can be temporarily set in the transportation system to be analyzed. Meanwhile, the data processing device 1 is installed permanently in a building such as an office or a factory. After completion of temperature measurement, the data measuring device 2 is inserted into the data processing device 1 which then receives the temperature data from the data measuring device 2 by an electromagnetic transmission. In order to conserve electric power, the power voltage VDD used for the data measuring device 2 (for example +3V) is smaller than the power voltage VCC used for the data processing device 1 (for example +5V). This difference in power voltages influences the communication between the data processing device 1 and the data measuring device 2, the details of which will be discussed later.

In addition to transmission of data to and reception of data from the data measuring device 2, the data processing device 1 is required to supply electric power for the data measuring device 2. The data processing device 1 therefore includes the data transferring unit 10, the data processing unit 20 and the power supply 30. The data measuring device 2 includes the data transferring unit 40, the controller 50, the power supply 60, the display unit 70, the storage unit 80, the temperature detecting unit 90, and the clock 100.

In the data processing device 1, the data processing unit 20 includes a CPU or MPU, which prepares the transmission data SD1, processes the receipt data RD1 and controls the data transferring unit 10 using the control signal CON1.

The data transferring unit 10 includes the tri-state buffer 11, the capacitor 12, the coil 13, the pair of diodes 14A and 14B, the AND circuit 15, the monostable multivibrator 16 and the bias circuit 17. The tri-state buffer 11 is used for transmission of the data SD1, whereas the AND circuit 1S is used for receipt of the data RD1. The data processing unit 20 applies the control signal CON1 to both the tri-state buffer 11 and the AND circuit 15 to provide half-duplex communication. The "low" signal CON1 specifically allows the tri-state buffer 11 to output transmission data but prevents the AND circuit 15 from a simultaneous output of receipt data. Conversely, the "high"signal CON1 prevents the tri-state buffer 11 from outputting transmission data but allows the AND circuit 15 to output receipt data. If an additional coil or another signal frequency is used, other communication is possible, including full-duplex communication.

The capacitor 12 is positioned behind the tri-state buffer 11 and allows the alternating component of the signal output from the tri-state buffer 11 to pass through. Next to the capacitor 12 exists the coil 13, which transmits and receives the data SD1 and RD1. The coil 13 is a pattern printed on the circuit board; five millimeters in diameter and approximately 12 turns without a core. One end of the coil 13 forms the node N12. The diodes 14A and 14B, used for overvoltage protection, are in series between the voltage VCC and the node N12. The bias circuit 17 is connected to the node N12 and includes the diode 17A, the capacitor 17B, and the resistor 17C. The diode 17A is designed to be in series with both the coil 13 and the resistor 17C, and is in parallel with the capacitor 17B. The resistor 17C provides a current to the diode 17A which subsequently uses forward voltage to increase the voltage of the node N12. The capacitor 17B stabilizes the level of change to the voltage of the node N12. As will be discussed, the increase in voltage facilitates the receipt of data from the data measuring device 2.

The other end of the coil 13 forms the node N11 which is connected to the AND circuit 15. The monostable multivibrator 16 is connected to the AND circuit 15 and includes the flip-flop circuit 16A, the resistor 16B, and the capacitor 16C. The resistor 16B and the capacitor 16C define a pulse width which is used by the flip-flop circuit 16A to output the signal RD1 to the data processing unit 20. The monostable multivibrator 16 acts in response to the increase in receipt data from the AND circuit 15.

The power supply 30 comprises the oscillator 31, the INVERT circuit 32, the NAND circuits 33A and 33B, the NMOS circuits 34A and 34B, the coil 35, the AND circuits 36A and 36B, the monostable multivibrator 37, the LPF circuit 38, and the buffer 39. The oscillator 31 oscillates a continuous signal CK (8MHz for example) Which is fed to the INVERT circuit 32, the NAND circuit 33B, and the monostable multivibrator 37.

The INVERT circuit 32 inverts the signal CK and feeds the inverted signal CK into the NAND 33A. The output of the NAND circuit 33A is fed to the NAND circuit 33B which also feeds output back to the NAND circuit 33A.

The outputs of the NAND circuits 33A and 33B are also fed into the AND circuits 36A and 36B, respectively. Subsequently, the outputs of the AND circuits 36A and 36B are provided to the NMOS circuits 34A and 34B, respectively. The sources of the NMOS 34A and 34B are connected to ground and the drains of the NMOS 34A and 34B are connected to the coil 35. The coil 35 has a centertap which is connected to the voltage VCC. The coil 35 is a pattern printed on the wiring board; 10 millimeters in diameter and approximately 40 turns without a core.

Within monostable multivibrator 37, the resistor 37B and the capacitor 37C define a pulse width which is used by the flip-flop 37A to output a pulse in response to the output CK of the oscillator 31. The LPF 38 defines a time constant using the resistor 38A and the capacitor 38B. The time constant is defined such that the LPF 38 is capable of detecting a missing pulse in the clock output CK. The LPF 38 smoothes the pulses output by the monostable multivibrator 37 and functions like "a retrigger circuit". The time constant can be defined to be 0.1 microsecond, for example. The buffer 39, which may be designed to include two INVERT circuits, drives the AND circuits 36A and 36B. Preferably, the buffer 39 should also include a Schmidt trigger circuit which prevents chattering of the output.

In summary: under normal operating conditions the NMOS 34A and 34B are driven by the outputs of the oscillator 31, however, in the case of malfunction or irregular operation, the NMOS 34A and 34B are controlled by the outputs of the monostable multivibrator 37, the LPF 38, and the buffer 39.

Within the data measuring device 2, the data transferring unit 40 includes the tri-state buffer circuit 41, the capacitor 42, the coil 43, the pair of diodes 44A and 44B, the AND circuit 45, and the monostable multivibrator 46. The tri-state 41, the capacitor 42, the coil 43, the diodes 44A and 44B, the AND circuit 45, and the monostable multivibrator 46 function in a similar way to the previously described roles of the tri-state 11, the capacitor 12, the coil 13, the diodes 14A and 14B, the AND circuit 15, and the monostable multivibrator 16, respectively. In order to efficiently transmit and receive data, the coil 43 is positioned such that it faces the coil 13 when the data measuring device 2 is inserted into the data processing device 1. As mentioned previously, the voltage VCC is higher than the voltage VDD and therefore, the threshold in the data measuring device 2 is lower than that in the data processing device 1. Although the highest possible data output level from the data processing device 1 is relatively low, the data measuring device 2 is able to recognize the level as being high. Thus, the data measuring device 2 does not require the incorporation of a circuit corresponding to the bias circuit 17 of the data processing device 1.

Following the electromagnetic transmission of electric power from the power supply 30 to the power supply 60, power is conveyed to all units within the data measuring device 2. The power supply 60 includes the coil 61, the rectifier 62 and the battery 63. In order to allow electromagnetic transmission of power, the coil 61 is designed to face the coil 35 upon insertion of the data measuring device 2 into the data processing device 1. The coil 61 is a pattern printed on a wiring board; 10 millimeters in diameter and approximately 40 turns without a core. The rectifier 62 is a bridge circuit including four diodes. The rechargeable battery 63 provides electric power for the data measuring device when being used independently and is recharged when the data measuring device 2 is inserted into the data processing device 1.

Figure 2:
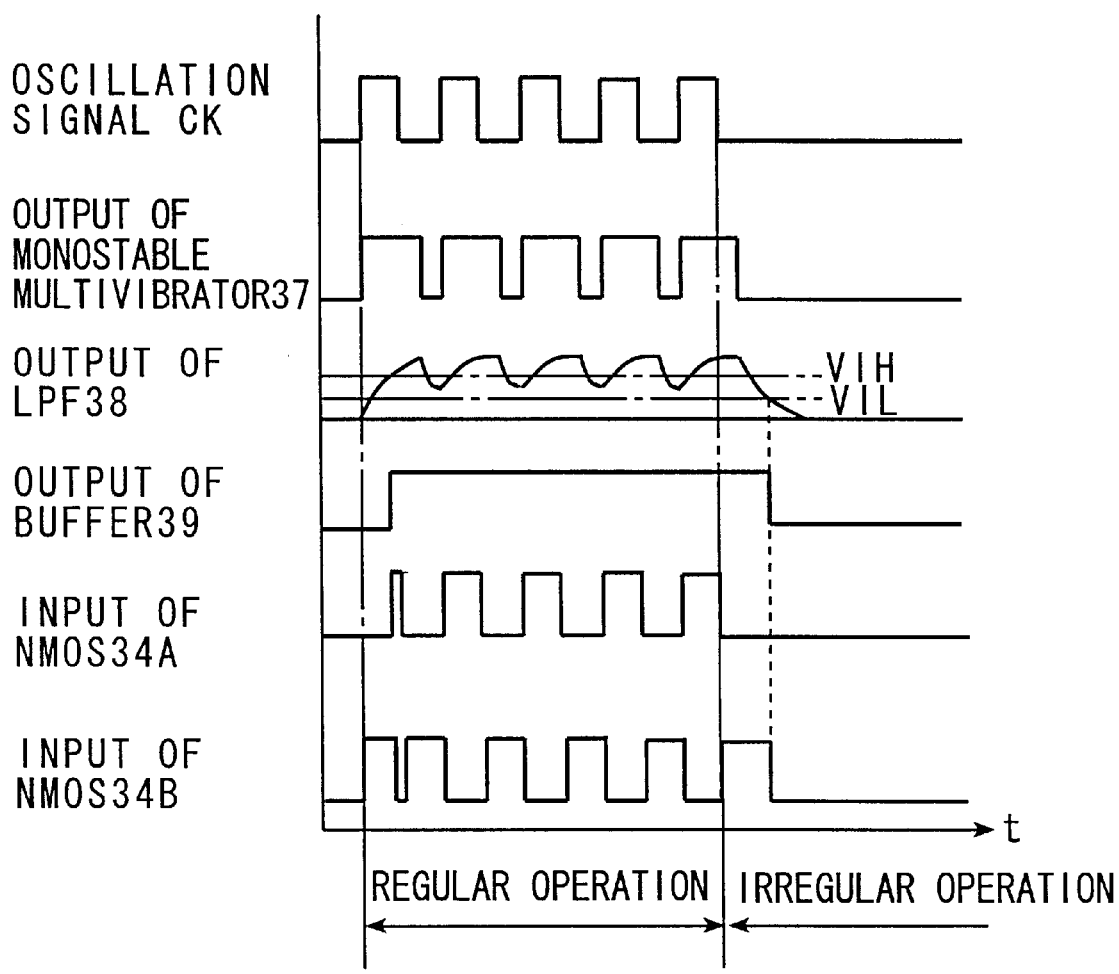
FIG. 2 shows an operation of the power supply in the data processing unit.

The operation of the power supplies 30 and 60 will now be explained referring to FIG. 2. It is assumed that an internal or external power supply (not shown) designed to generate the voltage VCC is already switched on. First, the data measuring device 2 is inserted into the data processing device 1. Next, the power supply 30 is turned on allowing the oscillator 31 to provide the 8 MHz clock CK for the INVERT circuit 32, the NAND circuit 33B, and the monostable multivibrator 37.

During regular operation, the oscillator 31 continuously generates the oscillation signal CK and the monostable multivibrator 37 outputs a pulse with the defined pulse width, in, response to the rising edge of the clock CK. As shown in FIG. 2, the output duty ratio of the monostable multivibrator 37 is larger than the output duty ratio of the oscillation signal CK and subsequently, the falling curve of the output of the LPF 38 is significantly sharper. In other words, if the output duty ratio of the monostable multivibrator 37 and the oscillation signal CK were similar, the falling curve of the output of the LPF 38 is required to be dull enough to keep the output level of the monostable multivibrator 37 high, over a given period of time, in expectation of the next incoming pulse.

In response to each incoming pulse, the LPF 38 outputs an "H" signal specifically like a saw tooth wave as long as the oscillator 31 continuously generates the clock CK. Similarly, the buffer 39 also outputs an "H" signal to both the AND circuits 36A and 36B as long as the output of the LPF 38 does not fall below the low level threshold VIL. The AND circuits 36A and 36B are thus allowed to turn on/off the respective NMOS 34A and 34B only under control of the oscillator 31. Since the INVERT circuit 32 inverts the clock CK, the incoming signals of the NAND circuits 33A and 33B are complementary and their outgoing signals are also complementary. Accordingly, the AND circuits 36A and 36B alternately switch on the corresponding NMOS circuits 34A and 34B in turn. The active NMOS circuit (either 34A or 34B) actuates the coil 35, which produces an alternating magnetic field. The magnetic field provides an electromotive force for the coil 61 in the power supply 60. The electromotive force produces an alternating current in the coil 61, which is converted to a direct current by the rectifier 62. The direct current is provided to all units within the data measuring device 2 as well as recharging the battery 63.

If a situation arises such that the oscillator 31 malfunctions or stops generating the oscillation signal CK, the output of the LPF 38 falls below the low level threshold VIL. This forces the buffer 39 to output a "L" signal, which prevents the AND circuits 36A and 36B from switching on the NMOS circuits 34A and 34B. Therefore, neither the NMOS circuit 34A nor 34B is able to continuously provide a current for the coil 35 when the oscillator 31 is broken or malfunctioning.

The operation of the transferring units 10 and 40 will now be explained in detail. First, the data measuring device 2 is inserted into the data processing device 1. Next, the power supply 30 is switched on causing the data processing device 1 to be on standby for communication with the data measuring device 2. The power supply 30 simultaneously provides electric power to the data measuring device 2 causing it to be on standby for communication with the data processing device 1.

Figure 3:
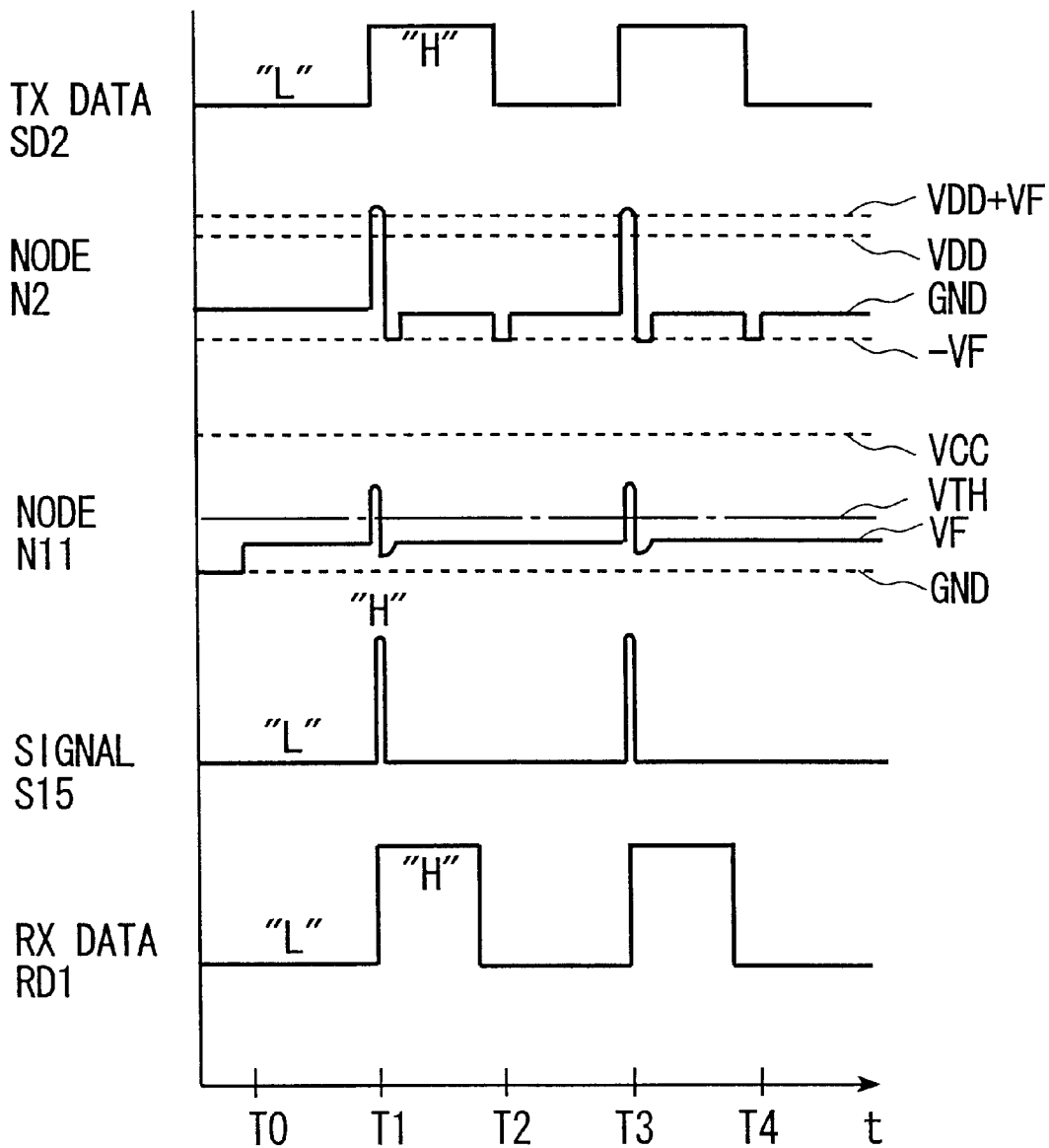
FIG. 3 shows an operation of the data transferring units in the data transmission system.

As shown in FIG. 3, at time T0, a current flows through the resistor 17C and diode 17A resulting in an increase in the voltage of the node N12 by the forward voltage of the diode 17A of approximately 0.7 volts, and more preferably by the voltage corresponding to the difference between half of the voltage VDD and half of the voltage VCC. The voltage of the node N11 is similarly increased by the forward voltage of the diode 17A.

At time T1, a rising edge of the transmission data SD2 is applied to the coil 43 through the tri-state buffer 41 and the capacitor 42. This results in a change in the magnetic field of the coil 43. The signal of the node N2 at time T1 is like a differential wave and the diodes 44A and 44B limit the amplitude of the signal of the node N2 within VDD+VF and GND−VF, where VF denotes the forward voltage of the diodes 44A and 44B.

The change in the magnetic field of the coil 43 provides the electromotive force for the coil 13. The electromotive force produces a signal wave at the node N11 similar to that observed at the node N2. In this case, since the voltage of the node N11 has been raised by the forward voltage of the diode 17A, the actual voltage of the node N11 is the sum of the forward voltage of the diode 17A and the electromotive force produced in the coil 13. As a result, the actual voltage of the node N11 at time T1 (for example VCC/2) readily exceeds the threshold of the AND circuit 15 and forces the AND circuit 15 to output an "H" signal S15. Upon receipt of the "H" signal S15, the monostable multivibrator 16 produces a pulse RD1 which is regulated by. the time constant defined by the resistor 16B and the capacitor 16C.

At time T2, a falling edge of the transmission data SD2 is applied to the node N2, which produces a negative pulse. The voltage of the pulse is limited by the diode 44B such that it does not fall below GND-VF. At time T3, the rising edge of the transmission data SD2 is applied to the coil 43, providing a similar result to that observed at time T1.

As described previously, the bias circuit 17 increases the voltage of the node N12 using the forward voltage of the diode 17A. Therefore, although the high level of the transmission data SD2 is relatively. low in comparison with the threshold of the AND circuit 15, the addition of the forward voltage of the diode 17A boosts the level of the data SD2 to exceed the threshold of the AND circuit 15. This enables reliable communication between the data processing device 1 and the data measuring device 2, even though the voltages for the two devices differ significantly from each other.

As discussed above, raising the voltage of an end of the coil used for receiving the receipt data enhances the reliability of communication between the two devices when compared with the conventional art. Since the reliability of communication is superior in the new. invention, the distance between the two devices may be increased, which facilitates the insertion of one device into another device.

The reliability of communication decreases with the larger distance between coils, however, the distance can be limited to provide the same reliability observed in the conventional art.

In the above power supplies, the voltage VCC and VDD differ from each other, however, if both are the same, two bias circuits may be provided in the devices respectively. These bias circuits serve to enhance the reliability of communication or to enable the enlargement of the distance between the devices.

Although the present invention has been described by way of exemplary embodiments, it should be understood that many changes and substitutions may be made by those skilled in the art without departing from the spirit and the scope of the present invention which is defined only by the appended claims.

What is claimed is:

1. A data transmission system including a first device and a second device communicating with each other by electromagnetic induction,
    wherein said first device comprises
        a preparing circuit that prepares a data having a voltage defined related to a first threshold; and
        a transmitting circuit that transmits said data prepared by said preparing circuit,
    wherein said second device comprises
        a receiving circuit that receives said data from said transmitting circuit;
        a bias circuit that raises said voltage of said received data by a predetermined voltage to produce a sum voltage; and
        a judging circuit that judges whether said voltage of said data indicates high or low by comparing said sum voltage with a second threshold that is equal to or larger than said first threshold,
    wherein said receiving circuit includes a coil that produces an electromotive force upon receiving said data from said transmitting circuit, and
    wherein said bias circuit includes a diode that is connected to said coil in series to increase said electromotive force by a forward voltage of said diode.

2. A data transmission system as set forth in claim 1, wherein
    said bias circuit further includes a capacitor that stabilizes said given voltage.

3. A data receipt device that receives data by electromagnetic induction comprising:
    a receiving circuit that receives data having a voltage defined related to a first threshold;
    a bias circuit that raises said voltage of said received data by a predetermined voltage to produce a sum voltage; and
    a judging circuit that judges whether said voltage of said data indicates high or low by comparing said sum voltage with a second threshold that is equal to or larger than said first threshold,
        wherein said receiving circuit includes a coil that produces an electromotive force upon receiving said data from said transmitting circuit, and
        wherein said bias circuit includes a diode that is connected to said coil in series to increase said electromotive force by a forward voltage of said diode.

4. A data recede set forth in claim 3, wherein
    said bias circuit further includes a capacitor that stabilizes said given voltage.

5. A data transmission system including a first device and second device communicating with each other, said first device having a power supply that provides electric power for said second device using a magnetic field,
    wherein said power supply comprises
        an oscillator that generates an oscillation signal;
        a magnetic field preparing circuit that prepares said magnetic field;
        a current supplying circuit that supplies a current to said magnetic field preparing circuit according to said oscillation signal;
        a detecting circuit that detects a halt of generating said oscillation signal by said oscillator; and
        a switching circuit that turns off said current supplying circuit upon detecting said halt,
    wherein said oscillation signal includes a plurality of first pulses, wherein said detecting circuit includes
        a generating circuit that generates a second pulse that permits said switching circuit to keep said current supplying circuit turned on, in response to each first pulse; and
        a smoothing circuit that smoothes said second pulses; and
    wherein said switching circuit turns off said current supplying circuit in an absence of said smoothed second pulses.

6. A data transmission system as set forth in claim 5, wherein
    said generating circuit includes
        a first resistor and a first capacitor that defines a first time constant of said second pulse, and
        a flip-flop circuit that detects each first pulse to generate said second pulse defined by said first time constant.

7. A data transmission system as set forth in claim 6, wherein
    said smoothing circuit includes a second resistor and a second capacitor that defines a second time constant used for smoothing said second pulses.

8. A data transmission system as set forth in claim 5, wherein
    said detecting circuit further includes a Schmidt trigger circuit that forbids said smoothed second pulses to force said turning off of said current supplying circuit due to chatter.

9. A device that communicates by electromagnetic induction, comprising a power supply,
    wherein said power supply includes
        an oscillator that generates an oscillation signal;
        a magnetic field preparing circuit that prepares said magnetic field;
        a current supplying circuit that supplies a current to said magnetic field preparing circuit according to said oscillation signal;
        a detecting circuit that detects a halt of generating said oscillation signal by said oscillator; and
        a switching circuit that turns off said current supplying circuit upon detecting said halt,
    wherein said oscillation signal includes a plurality of first pulses,
    wherein said detecting circuit includes
        a generating circuit that generates a second pulse that permits said switching circuit to keep said current supplying circuit turned on, in response to each first pulse; and a smoothing circuit that smoothes said second pulses; and wherein said switching circuit turns off said current supplying circuit in an absence of said smoothed second pulses.

10. A device as set forth in claim 9, wherein said generating circuit includes a first resistor and a first capacitor that defines a first time constant of said second pulse, and a flip-flop circuit that detects each first pulse to generate said second pulse defined by said first time constant.

11. A device as set forth in claim 10, wherein said smoothing circuit includes a second resistor and a second capacitor that defines a second time constant used for smoothing said second pulses.

12. A data transmission system as set forth in claim 9, wherein said detecting circuit further includes a Schmidt trigger circuit that forbids said smoothed second pulses to force said turning off of said current supplying circuit due to chatter.

13. A data receipt method used for a data receipt device receiving data by electromagnetic induction comprising:

receiving a data having a voltage defined related to a first threshold;

increasing said voltage of said received data by a predetermined voltage to produce a sum voltage; and judging whether said voltage of said data indicates high or low by comparing said sum voltage with a second threshold that is equal to or larger than said first threshold, wherein said increasing includes raising said voltage of said received data by said predetermined voltage defined by said first threshold and said second threshold.

14. A power supplying method used for a device that communicates by electromagnetic induction comprising:

generating an oscillation signal that includes a plurality of first pulses;

using a current supplying circuit to supply a current according to said oscillation signal;

preparing a magnetic field using said current;

first detecting a halt of said generating of said oscillation signal; and using a switching circuit to turn off said supplying said current upon detection of said halt, wherein the step of first detecting a halt of said generating of said oscillation signal comprises generating a second pulse that permits said switching circuit to keep said current supplying circuit turned on in response to each first pulse, and smoothing said second pulses, and wherein said switching circuit turns off said current supplying circuit in an absence of said smoothed second pulses.

15. A power supplying method as set forth in claim 14, further comprising second detecting said generating of said oscillation signal; and allowing said supplying of said current during detection of said oscillation signal.

* * * * *